_United States Patent Office_

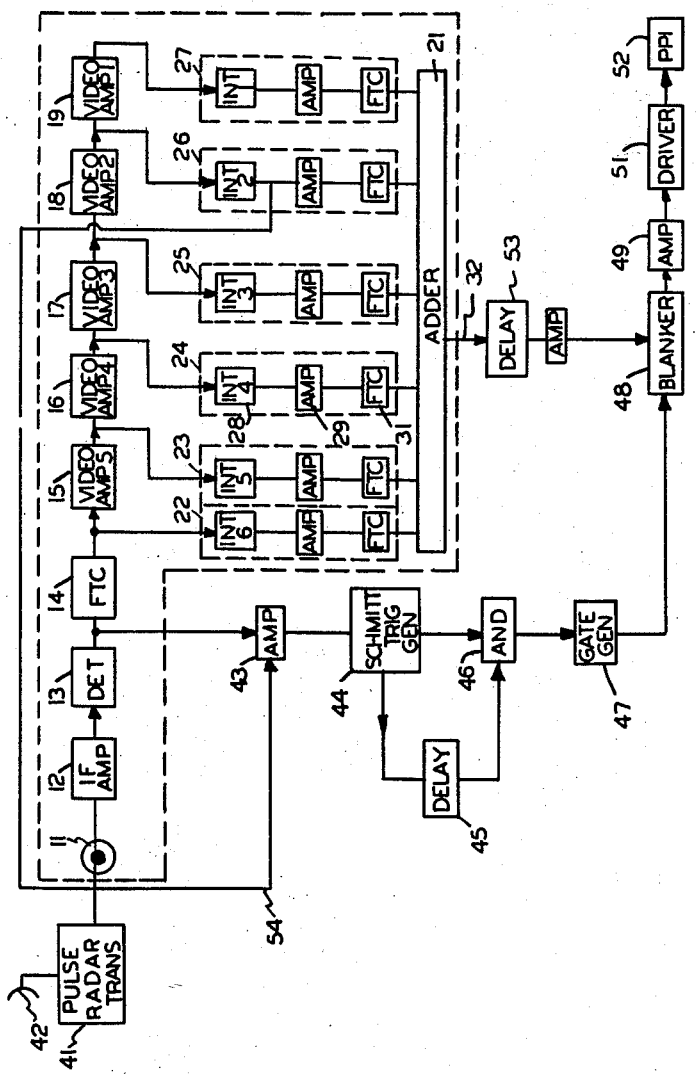

3,179,936
Patented Apr. 20, 1965

3,179,936
ANTI-CLUTTER RADAR RECEIVER
Oliver H. Baust and William E. Fickenscher, Baltimore, Md., assignors to The Bendix Corporation, Towson, Md., a corporation of Delaware
Filed June 7, 1961, Ser. No. 115,438
6 Claims. (Cl. 343—17.1)

This invention relates generally to an improved radar system employing receivers capable of wide dynamic range operation.

A wide dynamic range radar system is disclosed in a co-pending application of Martin and Baust for Linear Amplifier System, Serial No. 115,423, filed of even date herewith in which a linear receiver system is employed to obtain constant sensitivity to small signals in the presence of clutter or other large signal returns. This particular radar system, however, in the presence of noise jamming or sea clutter return suffers from the disadvantage of no maintaining a constant false alarm rate where fluctuations in the noise level are extremely rapid. Accordingly under such conditions of operation a radar system employing a linear receiver has a somewhat limited capability.

It is accordingly an object of the present invention to provide an improved radar system having wide dynamic range and constant false alarm rate characteristics as well as sub-clutter visibiilty.

A further object is to provide a radar system which minimizes both sea and land clutter returns and in which sea clutter sensitivity is reduced only by an amount proportional to the amplitude of the noise-like component of the sea clutter returns.

These and other objects of the invention will be apparent from the following detailed description taken in conjunction with the accompanying drawing in which the single figure shows a block diagram of the system in accordance with the invention.

The receiver employed in the radar system of the present invention employes an IF amplifier stage which drives a wide dynamic range detector, the non-saturating range of which is greater than 60 db. The output of the detector is differentiated and applied to a plurality of cascaded D.C. coupled video amplifiers. The inputs to each of the video amplifiers and the output of the final video amplifier stage are connected to pass through separate coupling circuits to an adder which combines the outputs from each of the tapped points on the video amplifier. The coupling circuits include a diode integrator circuit which produces a D.C. bias for controlling an amplifier in each coupling channel with the adjustments of the system being made so that the bias developed by the integrator cuts off the amplifier in its own channel at the same time that the respective video amplifier would begin to saturate. Thus weak signals are amplified in the entire video amplifier cascade while large signals saturate successive stages starting with the final stage until finally a signal 60 db above the minimum detectable signal will saturate all the stages. The gain at the various stages is adjusted so that the noise amplitude at the input to the adder is the same irrespective of which channel is supplying the input which is instantaneously effective to the adder. This amplifier is disclosed and claimed in the application of Oliver H. Baust, Serial Number 115,531, filed June 7, 1961.

A system in accordance with the invention provides a conventional pulse radar transmitter 41 which transmits a directional beam of energy by means of an antenna 42 and receives target echos through the same antenna. Echo signals are detected by conventional crystal mixer and duplexer circuits to provide an intermediate frequency which can be amplified in a pre-amplifier, if desired, and applied to an input terminal of the radar receiver.

The amplifier system for the amplification of amplitude modulated IF signals provides an input terminal 11 which couples IF signals to an IF amplifier stage 12. The output of the IF amplifier 12 is detected in a wide dynamic range detector 13 which is described in detail in the aforementioned application Serial No. 115,531. Detected signals, which may be of a pulse character, are differentiated in a fast time constant circuit 14 from which they pass to an input video amplifier stage 15. The video signals are amplified in successive video stages 16, 17, 18 and 19. The input signal to each of the video stages 15–19 and the output signal from video amplifier 19 are connected respectively through coupling circuits 22–27 to an adder 21 which has the characteristic of producing an output signal corresponding to the sum of the input signals thereto. Each of the coupling circuits 22–27 includes a diode integrator circuit 28 which produces a D.C. level corresponding to the noise input thereto which is applied as bias to an amplifier 29. This bias has sufficient magnitude to bias amplifier 29 to cut-off when the video amplifier stage which drives the coupling circuit begins to saturate. For example the level at which the amplifier 29 in coupling circuit 24 is cut-off is determined by the point at which video amplifier 16 begins to saturate. The output of each of the amplifiers 29 is differentiated in a fast time constant circuit 31 before being applied as one of the inputs to the adder 21. The output of the adder circuit 21 appears at lead 32 and when the system is properly adjusted provides a constant false alarm rate operation and substantially constant sensitivity over a wide dynamic range.

The signal from the output of the detector 13 is also applied to an amplifier 43 which supplies detected pulses to a Schmitt trigger generator 44. The Schmitt trigger generator 44 generates equal amplitude pulses of duration corresponding to the duration of the input pulses thereto. The output of the Schmitt trigger 44 is delayed in a delay line 45 by an amount equal to the pulse width of pulses transmitted by the radar 41. The output of the delay line 45 is applied as one input to an AND circuit 46 the other input to the AND being the direct output of the Schmitt trigger 44 which is not delayed. The AND circuit will produce an output only for pulses which are longer than the pulses transmitted by the radar 41 since only for such length pulses will coincidence in the inputs to the AND 46 occur. Such outputs are applied to a gate generator 47. The gate generator 47 operates a blanking circuit 48 which applies a blanking signal to the leading edge of pulses which coincide with an output from the AND 46. A blanking signal from blanker 48 is effective through amplifier 49 and driver 51 to eliminate the presentation on a PPI 52 of the leading edge of long pulses.

Target signals are displayed on the PPI 52 by passing signals from the output 32 of the adder 21 through a delay device 53 which introduces a delay similar to the delay device 45. This delay permits the leading edge of long clutter signals to arrive at the blanker 48 in coincidence with the initiation of the blanking pulse and thereby be eliminated by the action of this circuit. When no blanking pulse is generated the echo signals pass through the amplifier 49 and driver 51 to be displayed on the PPI 52.

The blanking gates which are produced for large blocks of clutter would sometimes be produced by numerous noise spikes which would cause multiple firing of the Schmitt trigger circuit 44 thereby operating AND circuit 46 erroneously to produce numerous undesired blanking gates. To prevent this undesirable mode of operation a D.C. bias is taken from the integrator and coupling circuit 26 by means of line 54 and applied to cut off the amplifier 43 whenever the noise level in coupling circuit 26 becomes high enough to develop the D.C. bias. With amplifier 43 cut-off the noise spikes cannot pass to the Schmitt trigger 44 to generate erroneous blanking signals and all gate generation for blanking purposes is stopped until the noise bias is reduced in coupling circuit 26.

In the radar system in accordance with the present invention, low level detection followed by differentiation affords sub-clutter visibility over land areas. The video amplifier produces a constant false alarm rate in the presence of noise jamming or sea-clutter return and the pulse width discriminator provides for blanking clutter leading edges. The sensitivity of this system is reduced in proportion to the amplitude of the noise-like component in sea-clutter and the sub sea-clutter visibility is proportional to the low frequency component of the return from the surface of the sea. Thus PPI saturation is avoided allowing targets to be tracked through the sea return area if target amplitude exceeds that of the average noise level. Over land areas sub-clutter visibility varies with the profile of the clutter return ranging from quite low in areas of sharply broken clutter spikes to as much as 55 db in areas of homogeneous clutter signals. C.W. jamming affects the sensitivity of the receiver only slightly over the dynamic range of the input preamplifier.

Modifications of the present system will be apparent to those skilled in the art in the light of the present disclosure and the invention, therefore, is to be limited only by the scope of the appended claims.

We claim:

1. A pulse radar system comprising means for transmitting radio pulses and receiving echo pulses from surrounding objects, means for detecting said echo pulses and translating said echo pulses into intermediate frequency pulse signals, a low level intermediate frequency amplifier for said pulse signals, a wide dynamic range detector coupled to said amplifier, a plurality of cascaded video stages having the input stage thereof fed from said detector, an adder circuit, a plurality of signal coupling means for coupling the signal at the input of each of said video stages and the output of the final video stage to the inputs of said adder circuit, each of said signal coupling means having a diode integrator, a bias controlled amplifier and a fast time constant circuit in cascade, said integrator developing a D.C. bias proportioned to the noise level input thereto, said bias applied to said bias controlled amplifier with magnitude sufficient to cut off said bias controlled amplifier when said noise level begins to saturate the video stage driving said integrator, and a plan position indicator operative for displaying the output of said adder circuit.

2. A radar system according to claim 1 and including means for generating a blanking pulse for received signals longer than the pulse width of transmitted pulses, and means for applying said blanking pulses to blank the display on said indicator of the leading edge of said longer signals.

3. Apparatus according to claim 2 and including means responsive to a detected noise level of predetermined magnitude in one of said video stages for disabling said blanking gate means.

4. A radar system according to claim 2 and including a coincidence circuit, delay means for delaying signals for a time interval equal to the pulse width of transmitted pulses, means for coupling detected signals through said delay means as one input to said coincidence circuit, means for coupling said detected signals without delay to the other input of said coincidence circuit, means for delaying the output of said adder circuit prior to display on said indicator, and means responsive to a coincidence output from said coincidence circuit for applying a blanking gate to said indicator to eliminate the display of the leading edge of pulses longer than said pulse width.

5. A pulse radar system comprising means for transmitting radio pulses and receiving echo pulses from surrounding objects; means for detecting said echo pulses and translating said echo pulses into intermediate frequency pulse signals; a low level intermediate frequency amplifier for said pulse signals; a wide dynamic range detector coupled to said amplifier; a constant false alarm rate video amplifier coupled to said detector; said video amplifier having a plurality of cascaded successively saturating video stages, an adding circuit, means for applying video signal at each of said video stages to the inputs of said adding circuit, a noise level detector at each of said video stages, and means responsive to the respective detected noise levels for disabling the corresponding input to said adding circuit when the video stage supplying said corresponding input reaches saturation; and a plan position indicator operative for displaying the output of said adder circuit.

6. A radar system according to claim 5 and including means for generating a blanking gate for received signals longer than the pulse width of transmitted pulses, and means for applying said blanking pulses to blank the display on said indicator of the leading edge of said longer signals.

No references cited.

KATHLEEN H. CLAFFY, *Primary Examiner.*

CHESTER L. JUSTUS, *Examiner.*